United States Patent
Cho et al.

(10) Patent No.: US 10,928,028 B2
(45) Date of Patent: Feb. 23, 2021

(54) VEHICLE LAMP ASSEMBLY

(71) Applicant: Nissan North America, Inc., Franklin, TN (US)

(72) Inventors: Thomas Cho, Novi, MI (US); Kenneth Bowers, Romeo, MI (US); Christopher Prisby, Farmington Hills, MI (US); Kent Agne, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 169 days.

(21) Appl. No.: 15/994,852

(22) Filed: May 31, 2018

(65) Prior Publication Data
US 2019/0368679 A1    Dec. 5, 2019

(51) Int. Cl.
*F21S 43/241*    (2018.01)
*F21S 43/14*    (2018.01)
*B60Q 1/26*    (2006.01)
*F21S 41/20*    (2018.01)
*G02B 5/02*    (2006.01)
*F21S 43/237*    (2018.01)
*B60Q 1/00*    (2006.01)
*F21S 43/245*    (2018.01)

(52) U.S. Cl.
CPC ............ *F21S 43/14* (2018.01); *B60Q 1/0011* (2013.01); *B60Q 1/2696* (2013.01); *F21S 41/28* (2018.01); *F21S 43/237* (2018.01); *F21S 43/241* (2018.01); *F21S 43/245* (2018.01); *G02B 5/0273* (2013.01)

(58) Field of Classification Search
CPC ...... F21S 43/235; F21S 43/236; F21S 43/237; F21S 43/241; F21S 43/245; B60Q 1/0011
See application file for complete search history.

(56) References Cited

U.S. PATENT DOCUMENTS

| | | |
|---|---|---|
| 9,328,891 B1 | 5/2016 | Dernar et al. |
| 2005/0213341 A1 | 9/2005 | Wehner |
| 2006/0234612 A1* | 10/2006 | Gotthardt ............. B60Q 1/0683 452/58 |
| 2010/0202153 A1 | 8/2010 | Schwab |
| 2010/0277946 A1 | 11/2010 | Shallcross et al. |
| 2012/0051077 A1 | 3/2012 | Arai |
| 2012/0069592 A1 | 3/2012 | Natsume et al. |

(Continued)

FOREIGN PATENT DOCUMENTS

WO    2011116045 A2    9/2011

*Primary Examiner* — Sean P Gramling
(74) *Attorney, Agent, or Firm* — Global IP Counselors, LLP

(57) ABSTRACT

A light pipe for a vehicle lamp assembly includes a first pipe portion and a second pipe portion. The first pipe portion has a first section that extends between a first end and a second end. A portion of the first section at least partially defines an intersection area. The first pipe portion defines a first optical path extending in a lengthwise direction of the first pipe portion. The second pipe portion has a second section that extends through the intersection area. The second pipe portion defines a second optical path. The second optical path intersects with and extends through the first optical path of the first pipe portion such that the first section and the second section define an angle greater than zero degrees and less than 180 degrees therebetween. The first pipe portion and the second pipe portion a unitarily formed as a single monolithic element.

13 Claims, 5 Drawing Sheets

(56) References Cited

U.S. PATENT DOCUMENTS

2013/0215633 A1     8/2013  Wuerthele et al.
2016/0109098 A1*    4/2016  Martoch ................. F21S 43/14
                                                          362/517

* cited by examiner

US 10,928,028 B2

VEHICLE LAMP ASSEMBLY

BACKGROUND

Field of the Invention

The present invention generally relates to a vehicle lamp assembly that illuminates the vehicle lamp assembly when supplied with electric power. More specifically, the present invention relates to a light pipe having at least a first pipe portion and a second pipe portion that define respective first and second optical paths that intersect with one another, and are unitarily formed as a single monolithic element.

Background Information

Many vehicle lamp assemblies currently include one or more light pipes that provide illumination for the lamp assemblies. Light pipes typically include a separate light source, such as an LED (light emitting diode) that is selectively operated by a vehicle operator. Such vehicle lamp assemblies include, for example, rear tail lamps, turn signal lamps, backup lamps, and, running light lamp assemblies. In lamp assembly designs that require more than one light pipe, the light pipes are separate elements, that are installed separately.

SUMMARY

One object of the present disclosure is to provide a lamp assembly with a light pipe that includes at least two light pipe portions, each defining a separate optical path that intersect with one another, where the at least two light pipe portions are unitarily formed as a single monolithic element.

In view of the state of the known technology, one aspect of the present disclosure is to provide a light pipe with a first pipe portion and a second pipe portion. The first pipe portion has a first end, a second end and a first section between the first end and the second end. A portion of the first section of the first pipe portion at least partially defining an intersection area. The first pipe portion defines a first optical path extending in a lengthwise direction of the first pipe portion. The second pipe portion has a first end, a second end and a second section that extends through the intersection area. The second pipe portion defines a second optical path extending in a lengthwise direction of the second pipe portion. The second optical path intersects with and extends through the first optical path of the first pipe portion such that the first section and the second section define an angle greater than zero degrees and less than 180 degrees therebetween. The first pipe portion and the second pipe portion are unitarily formed as a single, monolithic element.

BRIEF DESCRIPTION OF THE DRAWINGS

Referring now to the attached drawings which form a part of this original disclosure.

DETAILED DESCRIPTION OF EMBODIMENTS

Selected embodiments Will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
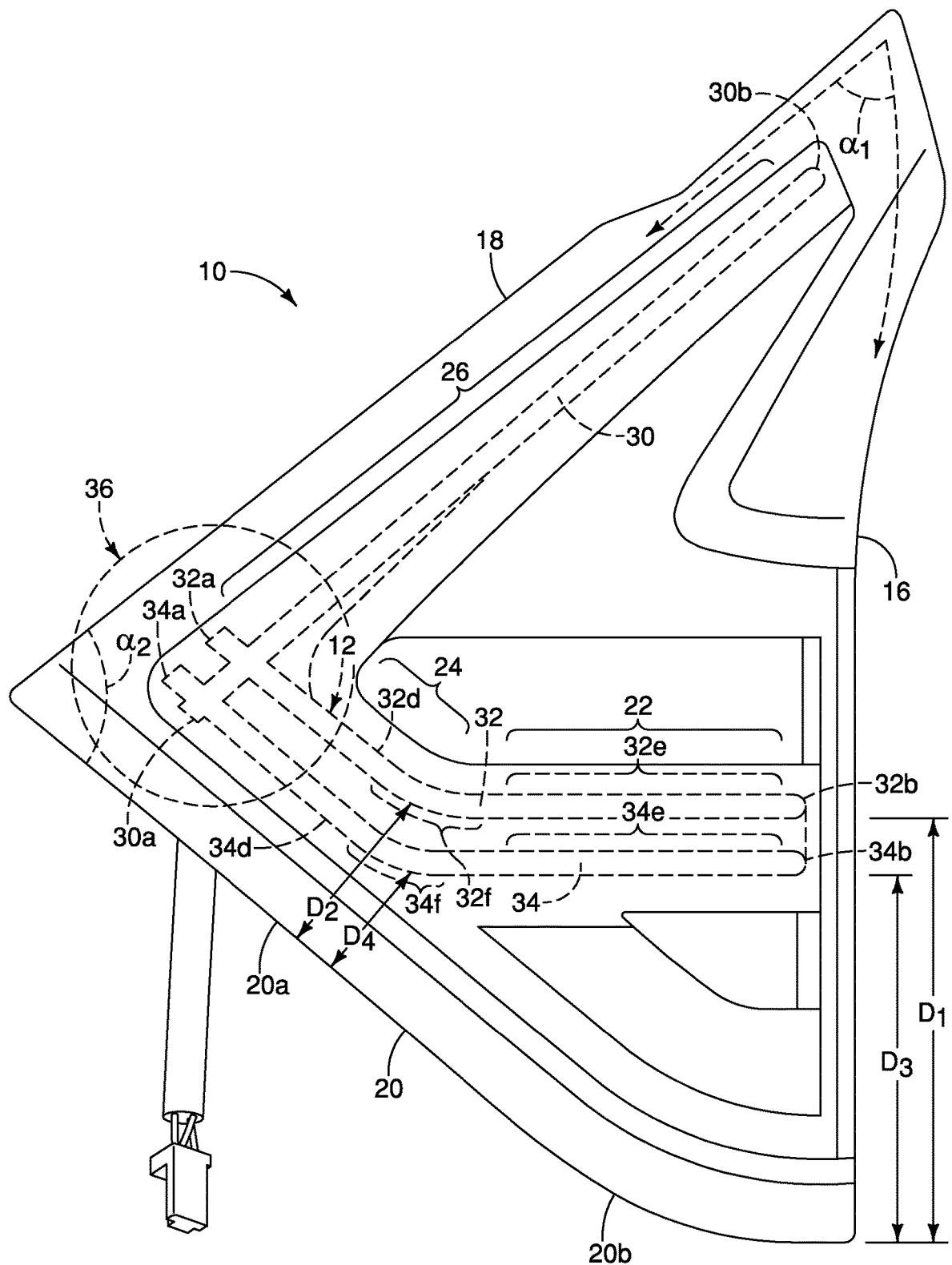
FIG. 1 is a plan view of a vehicle lamp assembly (a rear tail lamp assembly) that includes a light pipe in accordance with one embodiment.

Referring initially to FIG. 1, a vehicle lamp assembly 10 that includes a light pipe 12 is illustrated in accordance with a first embodiment.

The vehicle lamp assembly 10 is designed to serve as, for example, a rear tail light installed to a trunk lid (storage compartment lid) of a vehicle (not shown). However, it should be understood from the drawings and the description hereinbelow, that the vehicle lamp assembly 10 can serve as a lamp fixture for various areas of a vehicle and is not limited to the depicted shape and/or configuration.

The vehicle lamp assembly 10 has an outboard edge 16, an upper edge 18 and a lower edge 20. The majority of the outboard edge 16 is vertically oriented and conforms to the design of one side the trunk lid (not shown) of the vehicle (not shown). The outboard edge 16 is vertically oriented when installed to the vehicle, as shown in FIG. 1. The upper edge 18 is inclined from horizontal and defines an acute angle $\alpha_1$ relative to the outboard edge 16, and vertical. The angle $\alpha_1$ can be anywhere between 35 and 55 degrees. However, in the depicted embodiment, the angle $\alpha_1$ is approximately 45 degrees. The lower edge 20 has a straight portion 20a and a curved portion 20b. The straight portion 20a defines an angle $\alpha_2$ relative to the upper edge 18. The angle $\alpha_2$ can be anywhere between 70 and 90 degrees. However, in the depicted embodiment, the angle $\alpha_2$ is approximately 80 degrees. The curved portion 20b curves from the lower area of the lower edge 20 to the outboard edge 16.

The overall design of the vehicle lamp assembly 10 includes a unique lighting design. A first area 22, a second area 24 and a third area 26 area all illuminated by the light pipe 12. The first area 22 is horizontally oriented and extends inboard from adjacent to the outboard edge 16 to the second area 24. The second area 24 extends upward from the first area to the third area 26. The third area 26 extends upward and away from the second area 24 along and adjacent to the upper edge 18. The third area 26 is also approximately perpendicular to the second area 24. In order to achieve desired illumination of the vehicle lamp assembly 10, the light pipe 12 is provided with an overall shape, corresponding to the shape and relationships between the first, second and third areas 22, 24 and 26 of the vehicle lamp assembly 10.

Figure 2:
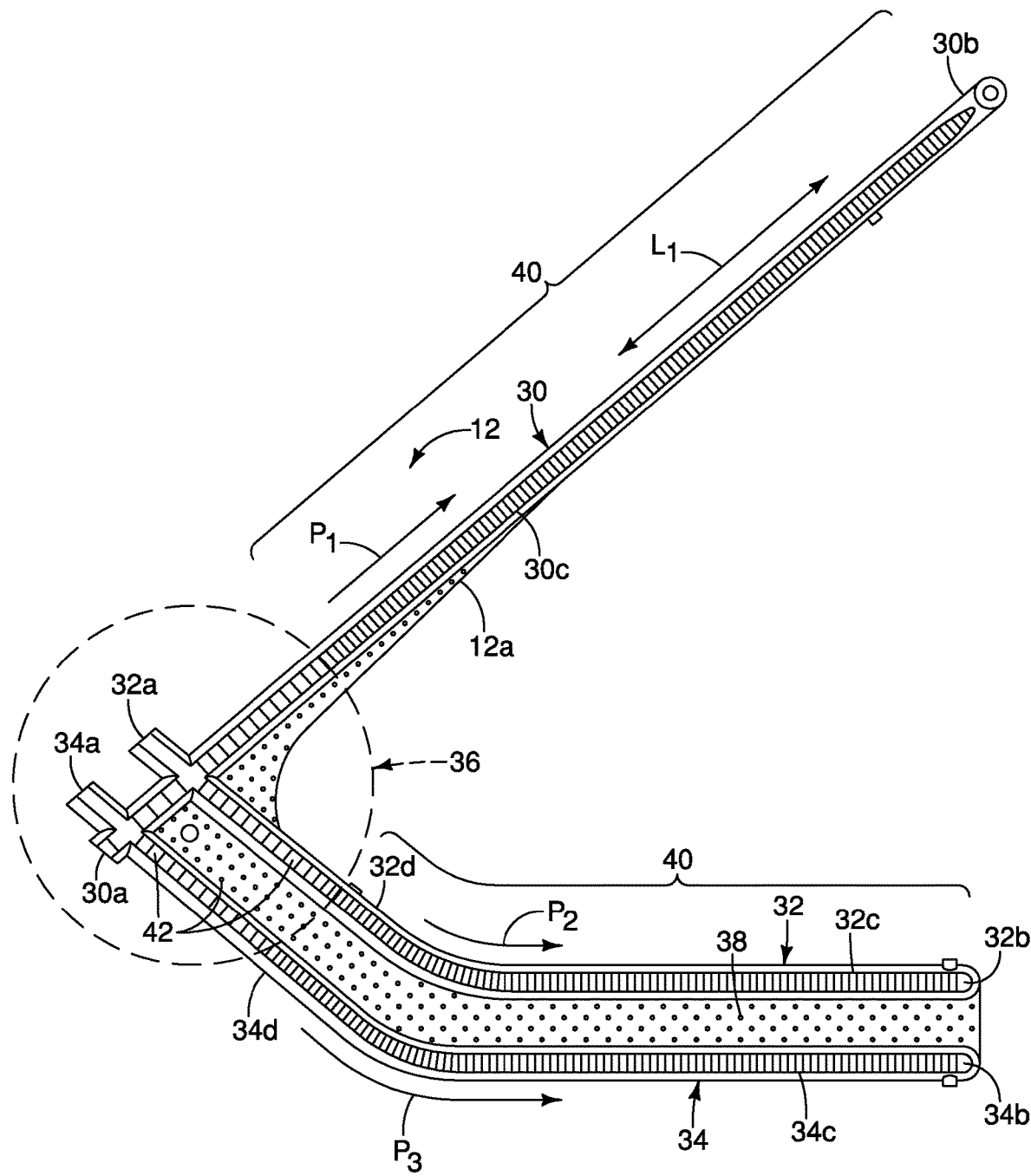
FIG. 2 is a plan view of an illumination side of the light pipe showing a first pipe portion, a second pipe portion and a third pipe portion with first ends of each of the first pipe portion, the second pipe portion and the third pipe portion being within an intersection area where the second and third pipe portions intersect with the first tight portion, and, portions of each of the first, second and third pipe portions outside the intersection area are provided with a first textured surface, and portions of each of the first, second and third pipe portions within the intersection area are provided with a second textured surface in accordance with the depicted embodiment.
Figure 3:
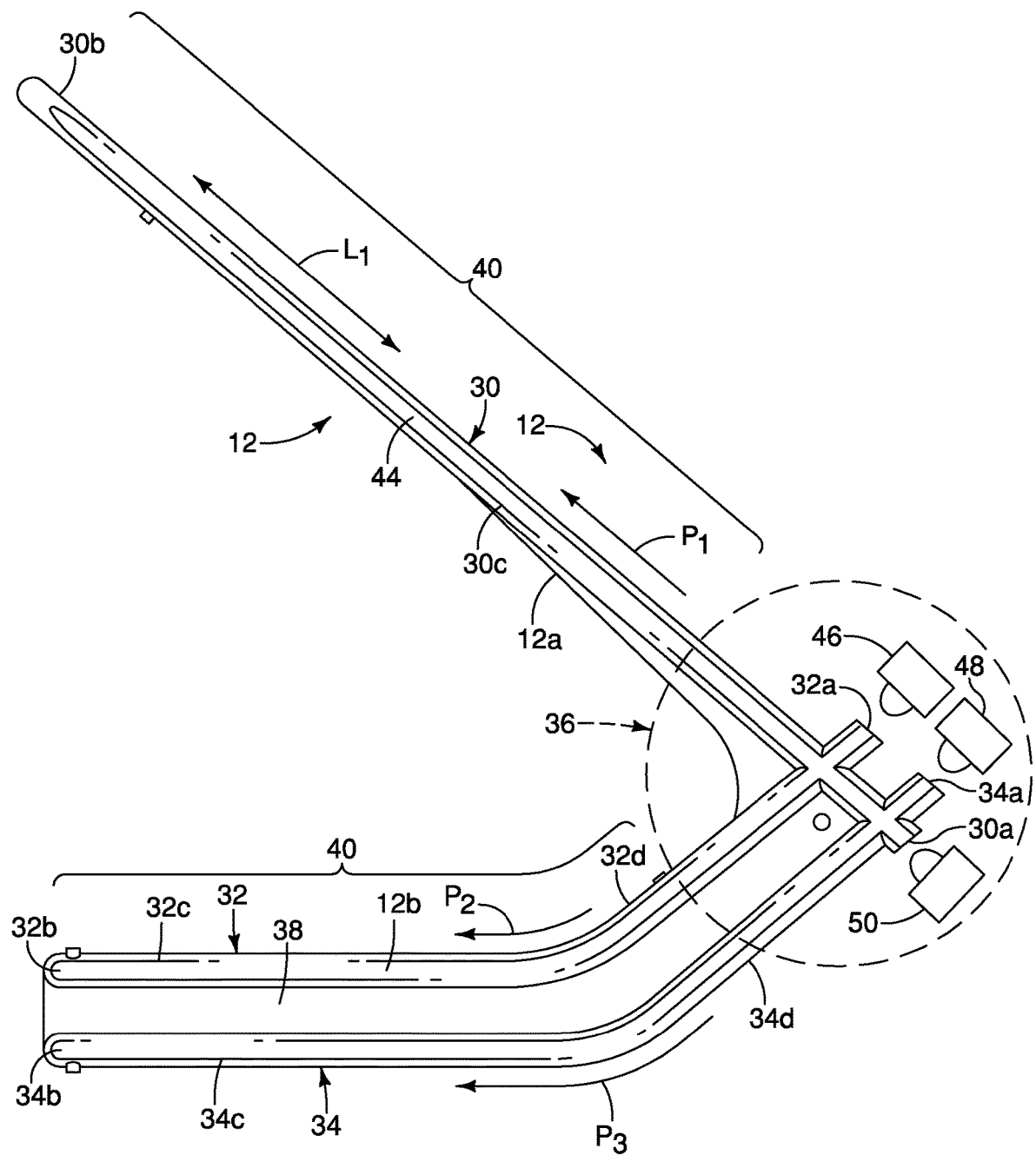
FIG. 3 is a plan view of a hidden side of the light pipe showing the first pipe portion, the second pipe portion and the third pipe portion with a third textured surface in accordance with the depicted embodiment.

FIG. 2 shows an illuminating side 12a of the light pipe 12 and FIG. 3 shows a hidden side 12b of the light pipe 12. Although only shown in phantom in FIG. 1, FIG. 1 also shows the illuminating side 12a of the light pipe 12.

The light pipe 12 is installed within the vehicle lamp housing 10 via mechanical fasteners (not shown), adhesive material (not, shown), or other conventional mechanical fastening structure, in order to illuminate predetermined areas of the vehicle lamp housing 10.

As shown in FIG. 2, removed from the vehicle lamp assembly 10, the light pipe 12 includes a first pipe portion 30, a second pipe portion 32 and a third pipe portion 34 that are unitarily formed as a single monolithic element. For example, the first pipe portion 30, the second pipe portion 32 and the third pipe portion 34 can be molded together in a single step process as one element in a single molding process.

The first pipe portion 30 has a first end 30a, a second end 30b, a first section 30c and a second section 30d. The first end 30a is located within the intersection area 36. The second end 30a defines a distal end of the first pipe portion 30. The first section 30c extends from, the first end 30a to the second end 30b. A portion of the first section 30c at least partially defines an intersection area 36. The intersection area 36 is an area where the first pipe portion 30, the second pipe portion 32 and the third pipe portion 34 intersect and are molded to one another. The second pipe portion 32 and the third pipe portion 34 extend approximately parallel to one another and do not intersect one another. Rather, the second pipe portion 32 and the third pipe portion 34 intersect and are integrally molded with the first pipe portion 30. The first pipe portion 30 defines a first optical path $P_1$ that extends in a lengthwise direction $L_1$ of the first pipe portion 30.

The second pipe portion 32 has a first end 32a, a second end 32b, a first section 32c and a second section 32d. The first end 32a is located within the intersection area 36. The second end 32a defines a distal end of the second pipe portion 32. The first section 32c and the second section 32d are angularly off set from one another defining an angle $\alpha_3$ therebetween. the angle $\alpha_3$ is approximately 140 degrees. However, the angle $\alpha_3$ can be any value between 125-180 degrees. The angle $\alpha_3$ is only necessary to provide illumination to predetermined areas of the vehicle lamp assembly 10, as shown in FIG. 1. Alternatively, the second pipe portion 32 can have any of a variety of shapes, such as straight, curved, serpentine, or other shapes in order to provide illumination where needed or desired.

At least a portion of the second section 32d extends trough the intersection area 36. The second pipe portion 32 defines a second optical path $P_2$ that is non-linear and extends in a lengthwise direction of the second pipe portion 32. The second optical path $P_2$ intersects and extending through the first optical path $P_1$ of the first pipe portion 30 such that the first section 30c of the first pipe portion 30 and the second section 32d extend in directions perpendicular to one another, as shown within the intersection area 36. Alternatively, the first pipe portion 30 and the second pipe portion 32 can define an angle there between that greater than zero degrees and less than 180 degrees therebetween. In other words, the first section 30c of the first pipe portion 30 and the second section 32d of the second pipe portion 32 are not required to be perpendicular to one another. Rather they are perpendicular to one another in the depicted embodiment.

Like the second pipe portion 32, the third pipe portion 34 has a first end 34a, a second end 34b, a first section 34c and a second section 34d. The first end 34a is located within the intersection area 36. The second end 34a defines a distal end of the third pipe portion 34. The first section 34c and the second section 34d are angularly off set from one another by the angle $\alpha_3$. Alternatively, the third pipe portion 34, like the second pipe portion 34 can have any of a variety of shapes, such as straight, curved, serpentine, or other shapes in order to provide illumination where needed or desired, so long as the second pipe portion 32 and the third pipe portion 34 extend approximately parallel to one another.

At least a portion of the second section 34d extends through the intersection area 36. The third pipe portion 34 defines a third optical path $P_3$ that is non-linear and extends in a lengthwise direction of the third pipe portion 34. The third optical path $P_3$ intersects and extending through the first optical path $P_1$ of the first pipe portion 30 such that the first section 30c of the first pipe portion 30 and the second section 34d extend in directions perpendicular to one another, as shown within the intersection area 36.

As shown in FIG. 1, the first pipe portion 30 extends along the upper edge 18 of the lamp housing 10 with the first end 30a of the first pipe portion 30 being proximate the lower edge 20 of the lamp housing 10 and the second end 30b being located proximate the outboard edge 18 of the lamp housing. The intersection area 36 is positioned proximate the intersection of the upper edge 18 and the lower edge 20 of the lamp housing 10 such that the second pipe portion 32 extends from the intersection area 36 toward the outboard edge 18 of the lamp housing 10. The outboard edge 16, the upper edge 18 and the lower edge 20 of the lamp housing 20 define an overall triangular shape.

As is also shown in FIG. 1, the second pipe portion 32 further defines a distal section 32e and a curved section 32f with the curved section 32e extending from the second section 32d and curving to the distal section 32e. The distal section 32e extending from the curved section 32f to the second end 32b of the second pipe portion 32 to a location adjacent to the outboard edge 16 of the lamp housing 10. The second end 32b of the second pipe portion 32 is spaced apart from the lower edge 20 of the lamp housing 10 by a first distance $D_1$ and the curved section 32f is spaced apart from the lower edge 20 of the lamp housing 10 by a second distance $D_2$ that is smaller than the first distance $D_1$. Further, as shown in FIG. 1, the first distance $D_1$ is more than twice the distance $D_2$. The second section 32b extends in a direction that is parallel to the lower edge 20 of the lamp housing 10. The curved section 32f is shaped such that the distal section 32e diverges away from the lower edge 20 of the lamp housing 10 toward the outboard edge 16 of the lamp housing 10.

As is further shown in FIG. 1, the third pipe portion 34 further defines a distal section 34e and a curved section 34f. The curved section 34f extends from the third section 34d of the third pipe portion 34 and curves to the distal section 34e. The distal section 34e of the third pipe portion 34 extends from the curved section 34f of the third pipe portion 34 to the second end 34b of the third pipe portion 34 adjacent to the outboard edge 16 of the lamp housing 10. The third section 34d of the third pipe portion 34 extends in a direction that is parallel to the lower edge 20 of the lamp housing 10. The curved section 34f of the third pipe portion 34 is shaped such that the distal section 34e of the third pipe portion 34 diverges away from the lower edge 20 of the lamp housing 10 toward the outboard edge 16 of the lamp housing 10. The second end 34b of the third pipe portion 34 is spaced apart from the lower edge 20 of the lamp housing by a third distance $D_3$. The curved section 34f of the third pipe portion 34 is spaced apart from the lower edge 20 of the lamp housing 10 by a fourth distance $D_4$ that is smaller than the third distance $D_3$. Further, as shown in FIG. 1, the third distance $D_3$ is more than twice the fourth distance $D_4$.

As shown in FIGS. 2 and 3, the third pipe portion 34 is parallel to, spaced apart from and adjacent to the second pipe portion 32. Further, the first end 30a of the first pipe portion 30, the first end 32a of the second pipe portion 32 and the first end 34a of the third pipe portion 34 are all located within the intersection area.

A joining flange 38 extends between the second pipe portion 32 and the third pipe portion 34, joining the second pipe portion 32 and the third pipe portion 34 throughout their respective lengths.

As shown in FIG. 2, the illuminating side 12a of each of the first pipe portion 30, the second pipe portion 32 and the third pipe portion 34 includes surface texturing. Specifically, the first pipe portion 30, the second pipe portion 32 and the third pipe portion 34 outside the intersection area 36 are provided with a first textured surface 40. The first textured surface 40 can take any of a variety of shapes and/or forms. For instance, the first textured surface 40 can include notches, ridges, surface roughness, a plurality of depressions, or any other type of surface texturing, that promotes light scattering out of those sections of the first pipe portion 30, the second pipe portion 32 and the third pipe portion 34 outside the intersection area 36. The first textured surface 40 is defined further by a surface imperfection density. In other words, the texturing of the first textured surface 40 includes a predetermined number of surface imperfection per square inch. For example, the first textured surface 40 can be defined by notches or recesses formed along the illuminating surface 12. The number and distance between each of these notches or recesses per square inch defines the surface imperfection density.

Those sections of the first pipe portion 30, the second pipe portion 32 and the third pipe portion 34 located within the intersection area 36 are provided with a second textured surface 42. Specifically, part of the first section 30c of the first pipe portion 30, part of the second section 32d of the second pipe portion 32 and part of the second section 34d of the third pipe portion 34, all located within the intersection area 36 include the second textured surface 42. The second textured surface 42 can include notches, ridges, surface roughness, a plurality of depressions, or any other type of surface texturing that promotes light scattering out of those sections of the first pipe portion 30, the second pipe portion 32 and the third pipe portion 34 within the intersection area 36. However, the surface imperfection density of the second textured surface 42 is less than the surface imperfection density of the first textured surface 40.

The difference between the first textured surface 40 and the second textured surface 42 is provided such that those parts of the first pipe portion 30, the second pipe portion 32 and the third pipe portion 34 located outside the intersection area 36 are desired to emit more light that the parts of the first pipe portion 30, the second pipe portion 32 and the third pipe portion 34 located within the intersection area 36. Since there are three light pipe portions within the intersection area 36, an overall greater amount of light can potentially be emitted per square inch of light pipe within the intersection area 36 than outside the intersection area 36. In order to slightly reduce the overall concentration of light emitted by those parts of the light pipe 12 within the intersection area 36 (as compared to outside the intersection area 36), the second textured surface 42 is designed to reduce light scattering (light emitted) from those parts of the light pipe 12 within the intersection area 36.

As shown in FIG. 3, the hidden side 12b of the light pipe 12 is provided with a third textured surface 44 that minimizes light scattered (emitted) from each of the first pipe portion 30, the second, pipe portion 32 and the third pipe portion 34. In the depicted embodiment, the third textured surface 44 is a smooth surface.

As shown schematically in FIG. 3, the first end 30a of the first pipe portion 30 is provided with a first LED 46 (light emitting diode) that provides light to the first pipe portion 30. The light from the first LED 46 propagates through the first light pipe 30 along the first optical path $P_1$. The first end 32a of the second pipe portion 32 is provided with a second LED 48 that provides light to, the second pipe portion 32. The light from the second LED 48 propagates through the second light pipe 32 along the first optical path. $P_2$. The first end 34a of the third pipe portion 34 is provided with a third LED 50 that, provides light to the third pipe portion 34. The light from the third LED 50 propagates through the third light pipe 34 alone the third optical path $P_3$.

Figure 4:
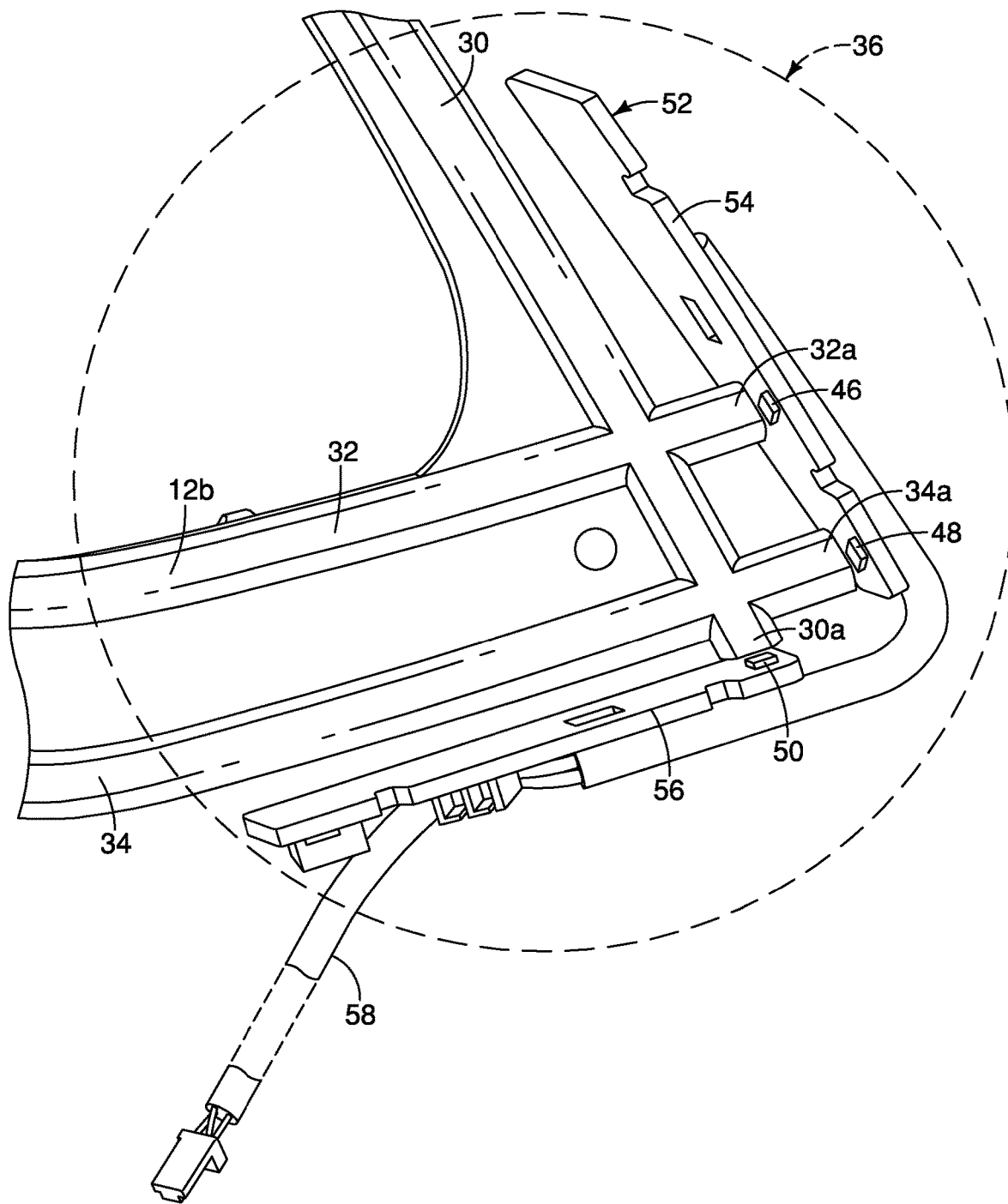
FIG. 4 is perspective view of the hidden side of the light pipe showing details of the first pipe portion, the second pipe portion and the third pipe portion within the intersection area, including respective LEDs that illuminate each of the first pipe portion, the second pipe portion and the third pipe portion in accordance with the depicted embodiment.

As shown in FIG. 4, a wiring assembly 52 is attached to the light pipe 12 at the intersection area 36. The wiring assembly 52 includes a first bracket 54, a second bracket 56 and a wiring harness 58. The first bracket 54 supports and positions the first LED 46 and the second LED 48. The second bracket 56 supports and, positions the third LED 50. Specifically, the first bracket 54 positions the first LED 46 such that the first LED 46 provides light to the first end 30a of the first pipe portion 30, and, positions the second LED 48 such that the second LED 48 provides light to the first end 32a of the second pipe portion 32. The second bracket 56 positions the third LED 50 such that the third LED 50 provides light to the first end 34a of the third pipe portion 34.

The first and second brackets 54 and 56 are attached to corresponding surfaces within the vehicle lamp assembly 10, and to the light pipe 12 via fasteners (not shown or adhesive material.

The wiring harness 58 is electrically connected to each of the first, second and third LEDs 46, 48 and 50 in a conventional manner. The wiring harness 58 is further attached to each of the first and second brackets 54 and 56.

Figure 5:
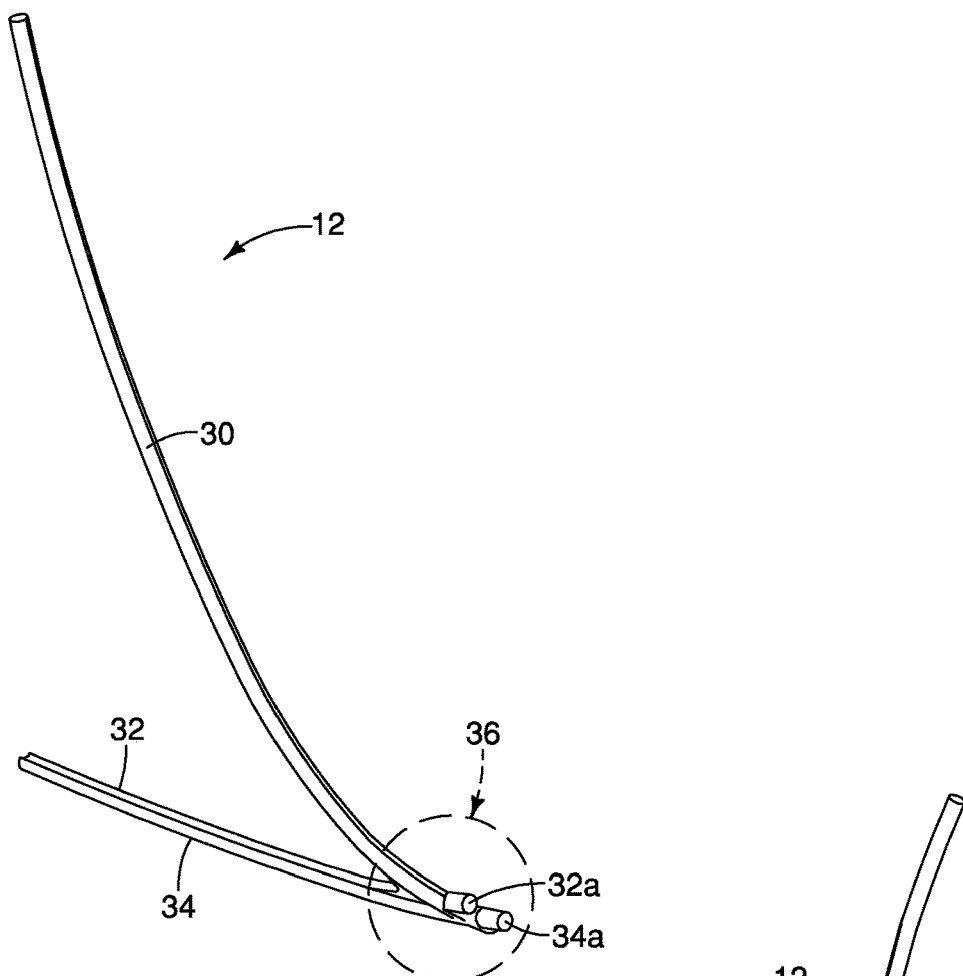
FIG. 5 is a first perspective view of the light pipe in accordance with the depicted embodiment.
Figure 6:
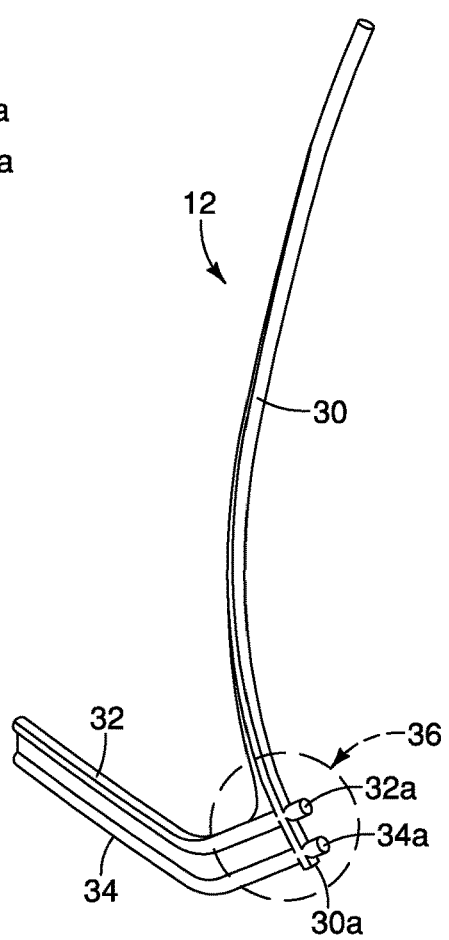
FIG. 6 is a second perspective view of the light pipe in accordance with the depicted embodiment.

As shown in FIGS. 5 and 6, the first pipe portion 30 can be provided with a curved shape, as viewed in perspective (FIG. 6) and from on edge thereof (FIG. 5). The curved contour of the first pipe portion 30 can be provided to correspond to the overall shapes and contours of the vehicle lamp assembly 10.

Further, as shown in FIG. 1, the first pipe portion 30 is installed within the vehicle lamp assembly 10 in order to illuminate the third area 26. The first section 32c of the second pipe portion 32 and the first section 34c of the third pipe portion 34 are positioned to illuminate the first area 22. The second section 32d of the second pipe portion 32 and the second section 34d of the third pipe portion 34 are positioned to illuminate the second area 24.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms. "including", "having" and their derivatives. Also, the terms "part," "section," "portion," "member" or "element" when used in the singular can have the dual meaning of a single part or a plurality of parts. Also as used herein to describe the above embodiment the following directional terms "forward", "rearward", "above", "downward", "vertical", "horizontal", "below" and "transverse" as well as any other similar directional terms refer to those directions of a vehicle equipped with the vehicle lamp assembly. Accordingly, these terms, as utilized to describe the present, invention should be interpreted relative to a vehicle equipped with the vehicle lamp assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting, each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle lamp assembly comprising:
    a lamp housing having an outboard edge, an upper edge and a lower edge; and
    a light pipe installed within the lamp housing in order to illuminate predetermined areas of the lamp housing, the light pipe including:
    a first pipe portion having a first end, a second end and a first section between the first end and the second end, a portion of the first section at least partially defining an intersection area, the first pipe portion defining a first optical path extending in a lengthwise direction of the first pipe portion, the first pipe portion extending along the upper edge of the lamp housing with the first end of the first pipe portion being proximate the lower edge of the lamp housing and the second end being located proximate the outboard edge of the lamp housing; and
    a second pipe portion having a first end, a second end and a second section that extends through the intersection area, the second pipe portion defining a second optical path extending in a lengthwise direction of the second pipe portion, the second optical path intersecting and extending through the first optical path of the first pipe portion such that the first section and the second section extend in directions perpendicular to one another, the first pipe portion and the second pipe portion being unitarily formed as a single monolithic element, the intersection area being positioned proximate the intersection of the upper edge and the lower edge of the lamp housing such that the second pipe portion extends from the intersection area toward the outboard edge of the lamp housing.

2. The vehicle lamp assembly according to claim 1, further comprising:
    a third pipe portion having a first end, a second end and a third section that extends through the intersection area, the third pipe portion defining a third optical path extending in a lengthwise direction of the third pipe portion, the third optical path intersecting and extending through the first optical path of the first pipe portion, the first pipe portion, the second pipe portion and the third pipe portion being unitarily formed as a single monolithic element.

3. The vehicle lamp assembly according to claim 2, wherein
    the third section of the third pipe portion is parallel to, spaced apart from and adjacent to the second section of the second pipe portion.

4. The vehicle lamp assembly according to claim 2, wherein
    the first end of the first pipe portion, the first end of the second pipe portion and the first end of the third pipe portion are all located within the intersection area.

5. The vehicle lamp assembly according to claim 2, further comprising
    a plurality of light emitting diode devices (LED) configured to provide illumination to the light pipe, including a first LED installed within the lamp housing adjacent to the first end of the first pipe portion, a second LED installed within the lamp housing adjacent to the first end of the second pipe portion and a third LED installed within the lamp housing adjacent to the first end of the third pipe portion.

6. The vehicle lamp assembly according to claim 2, wherein
    the first, second and third sections within the intersection area have textured outer surfaces such that light scattering radially outward from the first, second and third sections is reduced by the textured outer surfaces as compared to areas of the first, second and third pipe portions without textured outer surfaces.

7. The vehicle lamp assembly according to claim 2, wherein
    the outboard edge, the upper edge and the lower edge of the lamp housing define an overall triangular shape.

8. The vehicle lamp assembly according to claim 7, wherein
    the second pipe portion further defines a distal section and a curved section with the curved section extending from the second section and curving to the distal section, the distal section extending from the curved section to the second end of the second pipe portion to a location adjacent to the outboard edge of the lamp housing.

9. The vehicle lamp assembly according to claim 8, wherein
    the second end of the second pipe portion is spaced apart from the lower edge of the lamp housing by a first distance and the curved section is spaced apart from the lower edge of the lamp housing by a second distance that is smaller than the first distance.

10. The vehicle lamp assembly according to claim 8, wherein
the second section extends in a direction that is parallel to the lower edge of the lamp housing with the curved section being shaped such that the distal section diverges away from the lower edge of the lamp housing toward the outboard edge of the lamp housing.

11. The vehicle lamp assembly according to claim 10, wherein
the third pipe portion further defines a distal section and a curved section with the curved section extending from the third section and curving to the distal section, the distal section of the third pipe portion extending from the curved section of the third pipe portion to the second end of the third pipe portion adjacent to the outboard edge of the lamp housing.

12. The vehicle lamp assembly according to claim 11, wherein
the third section extends in a direction that is parallel to the lower edge of the lamp housing with the curved section of the third pipe portion being shaped such that the distal section of the third pipe portion diverges away from the lower edge of the lamp housing toward the outboard edge of the lamp housing.

13. The vehicle lamp assembly according to claim 11, wherein
the second end of the third pipe portion is spaced apart from the lower edge of the lamp housing by a third distance and the curved section of the third pipe portion is spaced apart from the lower edge of the lamp housing by a fourth distance that is smaller than the third distance.

* * * * *